US010169724B2

(12) United States Patent
Hogan et al.

(10) Patent No.: US 10,169,724 B2
(45) Date of Patent: Jan. 1, 2019

(54) DISPLAY OF USER RELATIONSHIPS (75) Inventors: Patricia S. Hogan, Raleigh, NC (US); Susan W. Brosnan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/326,074

(22) Filed: Dec. 14, 2011

(65) Prior Publication Data
US 2013/0159425 A1 Jun. 20, 2013

(51) Int. Cl.
G06F 15/16 (2006.01)
*G06Q 10/06* (2012.01)
*G06Q 10/10* (2012.01)

(52) U.S. Cl.
CPC ............. *G06Q 10/06* (2013.01); *G06Q 10/10* (2013.01); *G06Q 10/107* (2013.01)

(58) Field of Classification Search
CPC .... G06Q 50/01; G06Q 10/107; H04L 12/583; H04L 12/586; H04L 12/588; H04L 12/589; H04L 41/026; H04L 51/063; H04L 67/306; H04N 21/4786; H04N 21/4788; H04N 5/445
USPC ........................................................ 709/206
See application file for complete search history.

(56) References Cited

U.S. PATENT DOCUMENTS

| | | | |
|---|---|---|---|
| 6,175,831 B1 | 1/2001 | Weinreich et al. | |
| 7,167,910 B2 | 1/2007 | Farnham et al. | |
| 8,499,048 B2* | 7/2013 | Malik | G06Q 10/00 709/203 |
| 2003/0101091 A1* | 5/2003 | Levin et al. | 705/11 |
| 2003/0163530 A1* | 8/2003 | Ribak | G06Q 10/107 709/206 |
| 2004/0172456 A1* | 9/2004 | Green et al. | 709/207 |
| 2004/0210827 A1* | 10/2004 | Burg et al. | 715/501.1 |
| 2004/0236749 A1* | 11/2004 | Cortright | G06F 17/30607 |
| 2005/0015432 A1 | 1/2005 | Cohen | |
| 2005/0198031 A1* | 9/2005 | Pezaris | H04L 12/588 |
| 2005/0216300 A1* | 9/2005 | Appelman | G06Q 10/10 705/319 |
| 2005/0216566 A1* | 9/2005 | Engstrom | 709/206 |
| 2006/0031350 A1 | 2/2006 | Levi et al. | |
| 2006/0282303 A1 | 12/2006 | Hale et al. | |
| 2007/0005750 A1 | 1/2007 | Lunt et al. | |
| 2007/0276846 A1 | 11/2007 | Ramanathan et al. | |

(Continued)

FOREIGN PATENT DOCUMENTS

GB 2474128 A 6/2011
KR 2002094373 A 12/2002

OTHER PUBLICATIONS

UK Combined Search and Examination Report in corresponding GB patent application, GB1221431.8, dated Apr. 8, 2013.

*Primary Examiner* — Oleg Survillo
*Assistant Examiner* — Imran Moorad
(74) *Attorney, Agent, or Firm* — Grant Johnson (57) ABSTRACT

Information regarding each recipient of a selected group of users is retrieved, such as each recipient of a number of recipients of an email, and such as responsive to a request made in relation to the email. One or more relationships among the users are determined, based on the information retrieved regarding each user. Such relationships can include job groups, job titles, locations, and/or family relationships, among other types of relationships. The one or more relationships among the users are displayed.

20 Claims, 3 Drawing Sheets

(56) References Cited

U.S. PATENT DOCUMENTS

| | | |
|---|---|---|
| 2008/0205616 A1* | 8/2008 | Teng et al. ............... 379/202.01 |
| 2008/0222170 A1* | 9/2008 | Farnham et al. ............. 707/100 |
| 2009/0043861 A1* | 2/2009 | Bordia .......................... 709/206 |
| 2009/0150066 A1* | 6/2009 | Grason et al. ................ 701/202 |
| 2010/0125611 A1* | 5/2010 | Boutboul et al. ............. 707/794 |
| 2010/0169320 A1 | 7/2010 | Patnam et al. |
| 2010/0198678 A1* | 8/2010 | Burst ................ G06Q 30/0239 705/14.39 |
| 2010/0241638 A1 | 9/2010 | O'Sullivan et al. |
| 2010/0281049 A1 | 11/2010 | Simek et al. |
| 2010/0318613 A1* | 12/2010 | Souza ................ G06Q 10/107 709/206 |
| 2012/0143964 A1* | 6/2012 | DeLuca ................ H04L 51/34 709/206 |
| 2012/0144317 A1* | 6/2012 | Balasubramanian ... H04L 67/24 715/751 |
| 2013/0073971 A1* | 3/2013 | Huang et al. ................ 715/738 |

\* cited by examiner

DISPLAY OF USER RELATIONSHIPS

BACKGROUND

Electronic mail messages, commonly referred to as email, are a if not the primary way by which people electronically communicate with one another, particularly within entities like corporations and other organizations. Rather than meet in person, send now-antiquated inter-office memoranda, or even pick up the phone to call someone, many people find that email is an easy way to exchange information to perform their work as well as personal obligations, among other reasons.

SUMMARY

A computer program product of an embodiment of the disclosure includes a computer-readable storage medium having computer-readable code embodied therein and executable by a processor to perform a method. The method includes, responsive to a request from a user in relation to an email, retrieving information regarding each recipient of a plurality of recipients of the email. The method includes determining one or more relationships among the recipients of the email, based on the information retrieved regarding each recipient of the email. The method includes displaying the one or more relationships among the recipients of the email to the user from whom the request has been received.

A method of an embodiment of the disclosure includes receiving, by a processor, identification of a selected group of users. The method includes retrieving, by the processor, information regarding each user. The method includes determining, by the processor, one or more relationships among the users, based on the information retrieved regarding each user. The method includes displaying, by the processor, the one or more relationships among the users.

A system of an embodiment of the disclosure includes a processor, network hardware, and a computer-readable data storage medium. The network hardware is to communicatively connect to a storage device over a network. The storage device stores a database of information regarding users. The computer-readable data storage medium stores a computer program executable by the processor to retrieve from the database information regarding a number of given users selected from the users regarding whom information is stored in the database. The computer program is to determine and display on a display device one or more relationships among the given users.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, electronic mail messages, or mail, are a popular way by which people electronically communicate with one another. It is not uncommon for a user to receive an email in which he or she is one of a large number of recipients. For instance, large projects within corporations and other entities can at times require many different users to be included on status update emails, meeting scheduling emails, and so on.

A difficulty when receiving such a large-distribution email is that in formulating a reply email, a user may want to direct his or her reply in an appropriate fashion considering the audience, but may not have a clear understanding of who all the recipients are. For instance, if the prospective recipients of the user's reply email are primarily technical people, the user may want to include more technical information in the email than if most of the recipients are non-technical marketing people. As another example, if even some of the prospective recipients of the user's reply email are just tangentially related to the subject matter of the email, the user may not want to share sensitive information in his or her reply email.

Techniques are disclosed herein to permit a user to gain a sense for the recipients of an email of which the user is also a recipient. Information regarding each recipient of the email is retrieved, such as by querying a database. One more relationships among the recipients are determined based on this information. The relationships can include, for instance, job group relationships, job title relationships, location relationships, and/or family relationships, among other types of relationships. These relationships are then displayed to the user.

For example, the recipients of an email may include vice-presidents and engineers of a corporation that also employs the user in question, as well as outside consultants working on the project that is the subject of the email. The display of the relationships may show how the vice-presidents and engineers are related to one another with an organization chart of the corporation, with a dotted line to the outside consultants to indicate that these consultants are not employed by the corporation. The user may thus tailor a reply email appropriately, based on his or her gained understanding of these relationships.

Figure 1:
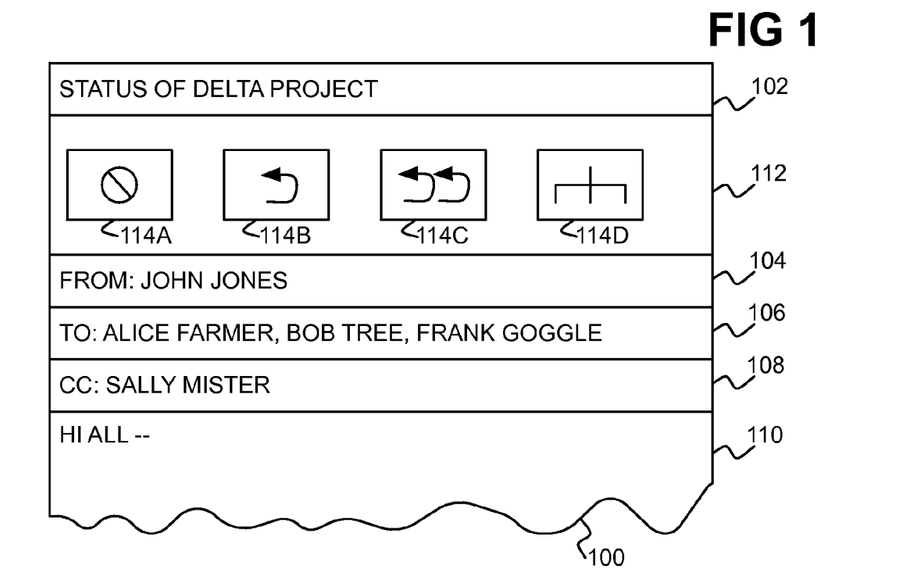
FIG. 1 is a diagram of an example email.

FIG. 1 shows an example email 100 that a user named Frank Goggle may have received. The email 100 includes a subject line 102 indicating that the subject matter of the email 100 pertains to the "status of the delta project." The email 100 includes a sender area 104 indicating that a user named John Jones sent the email 100. The email 100 includes a recipient area 106 indicating that, in addition to Frank Goggle, users named Alice Farmer and Bob Tree are primary recipients of the email 100. The email 100 includes a carbon copy, or cc, area 108 indicating that a user named Sally Mister has been cc'ed on the email 100. The email 100 also includes a text area 110 that includes the actual content of the email 100.

The email 100 may have a graphical user interface area 112 that includes a number of buttons 114A, 114B, 114C, and 114D, collectively referred to as the buttons 114, and which are more generally graphical user interface elements that Frank Goggle can select on his computing device. The buttons 114 can include a button 114A to delete the email 100, a button 114B to reply to the sender of the email 100 (i.e., John Jones), a button 114C to initiate a "reply all" action to everyone listed on the email 100 other than Frank Goggle (i.e., John Jones, Alice Farmer, Bob Tree, and Sally Mister), and a button 114D to show the relationships among the five users that are related to this group of five users.

Frank Goggle may desire to learn these relationships, so that if he were to initiate a "reply all" action to send a reply email to everyone listed on the email 100, Frank has an understanding of who these users are so that he can appropriately fashion the reply. Frank may, for instance, know John Jones well, because John is Frank's immediate manager. However, Frank may just be familiar with Alice Farmer and Bob Tree, having participated in one or two meetings with them, but not knowing their exact job titles and job groups. Furthermore, Sally Mister may be completely unknown to Frank. Therefore, Frank Goggle can select the button 114D to display the relationships among the five users that are listed on the email 100.

Figure 2A:
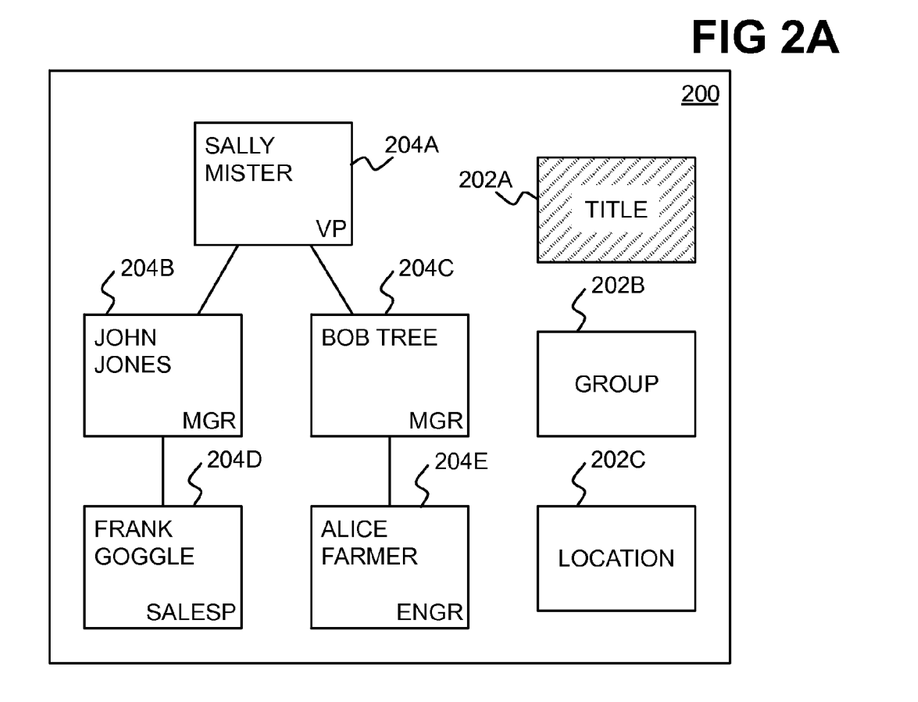
FIGS. 2A, 2B, and 2C are diagrams depicting different relationships among the users of the example email of FIG. 1, according to varying embodiments of the disclosure.
Figure 2B:
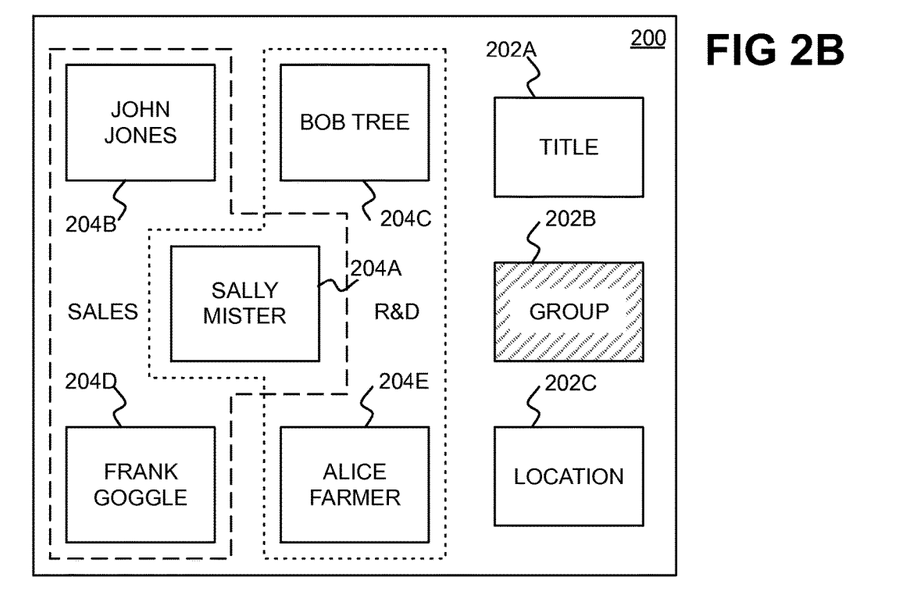
Figure 2C:
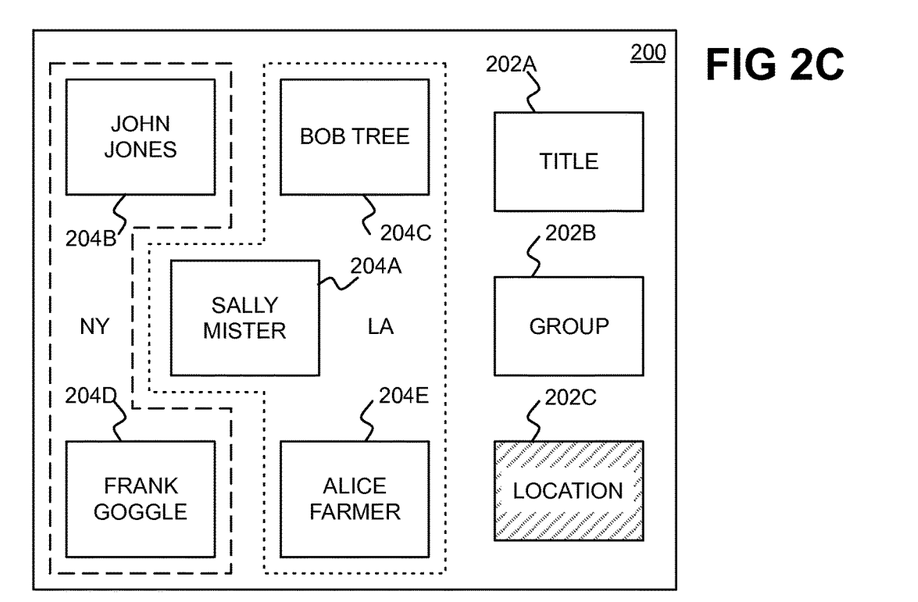

FIGS. 2A, 2B, and 2C show different versions of a window 200 that may be displayed responsive to Frank Goggle selecting the button 114D within the email 100, according to varying embodiments of the disclosure. The window 200 is more generally a graphical user interface element. The window includes three buttons 202A, 202B, and 202C, collectively referred to as the buttons 202, and which are also more generally graphical user interface elements. A user, like Frank Goggle, can select among the buttons 202 to view different relationships among the users related to the email 100. The currently selected button(s) 202 is displayed in FIGS. 2A, 2B, and 2C via shading.

In FIG. 2A, just the button 202A, corresponding to the relationship of job title, has been selected. Boxes 204A, 204B, 204C, 204D, and 204E, collectively referred to as the boxes 204 and which are more generally graphical user interface elements, and that correspond to the users Sally Mister, John Jones, Bob Tree, Frank Goggle, and Alice Farmer, respectively, are organizationally displayed to convey this relationship. As such, Frank Goggle can discern from the window 200 in FIG. 2A that Sally Mister is a vice-president to whom John Jones and Bob Tree, who are managers, report. Frank can see that himself and Alice Farmer report to John Jones and Bob Tree, respectively. Frank can finally see that he is a salesperson and that Alice Farmer is an engineer.

In FIG. 2B, just the button 202B, corresponding to the relationship of job group, has been selected. The boxes 204 are organizationally displayed to convey this relationship. As such, Frank Goggle can discern from the window 200 in FIG. 2B that himself, John Jones, and Sally Mister are part of the sales group, whereas Alice Farmer, Bob Tree, and Sally Mister are part of the research and development group. Sally Mister is thus in both groups. Furthermore, the job titles of all the users, and who reports to whom, are not shown in FIG. 2B.

In FIG. 2C, just the button 202C, corresponding to the relationship of location, has been selected. The boxes 204 are organizationally displayed to convey this relationship. As such, Frank Goggle can discern from the window 200 in FIG. 2C that himself and John Jones are located in New York, whereas Sally Mister, Alice Farmer, and Bob Tree are located in Los Angeles. The job titles of the users, who reports to whom, and the groups of the users, are not shown in FIG. 2C.

The examples that have been described above in relation to FIGS. 2A, 2B, and 2C each include just one button 202 being selected at any particular time. However, more than one button 202 may be selected in another implementation, such that the boxes 204 corresponding to the users are displayed in accordance with the selected buttons 202. For instance, if both buttons 202A and 202B are selected, then the boxes 204 are displayed to show both the title and group relationships among the users.

The relationships of title, group, and location are furthermore examples of such relationships that are particularly appropriate for users that are related to one another via their jobs. However, other relationships may be included as appropriate. For instance, if different subsets of the users are related as family, then the users may be displayed to denote their familial relationships, as just one example.

Variations can also be made in how the boxes 204 or other graphical user interface elements corresponding to the users are displayed. The information contained in each box 204 may further include contact information of a corresponding user, such as email address and/or phone number, as well as a picture of the user, and/or other information, too, like a mailing address. If there is a large number of users, it may be difficult to display this information for all the users at the same time. Therefore, just a user's name may be shown in a box 204, and when the box 204 is selected by the user, the other information revealed. Similarly, if there is an extremely large number of users, not all the boxes 204 may be displayed, but rather just the boxes pertaining to the currently selected group, location, and so on.

Figure 3:
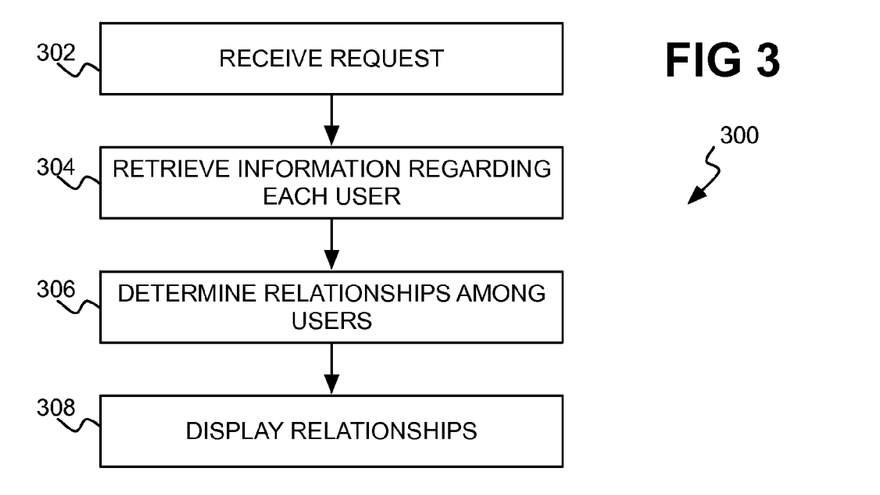
FIG. 3 is a flowchart of a method for displaying relationships among users, according to an embodiment of the disclosure.

FIG. 3 shows a method 300 for displaying relationships among users, according to an embodiment of the disclosure. The method 300 is performed by a processor, such as that of a computing device like a desktop or laptop computer. For instance, the processor may execute a computer program to perform the method 300.

A request is received (302). Receipt of the request can include receiving identification of a selected group of users among which relationships are to be determined and displayed. Identification in this respect can include email addresses, phone numbers, or other manners by which users can be identified. As an example, in relation to FIGS. 1, 2A, 2B, and 2C described above, a user may select a button or other graphical user interface element related to a currently displayed email, such that the selected group of users is automatically identified as those to which the email pertains. In this implementation, then, the button or other graphical user interface element is exposed by the same computer program that exposes the graphical user interface in conjunction with which the email is displayed—namely, an email messaging computer program.

Receiving identification of a selected group of users can also be achieved in other manners. A user may input identification of a list of users, such as their email addresses, within a graphical user interface element, such as a text box. For example, in relation to FIGS. 1, 2A, 2B, and 2C described above, the user may copy the email addresses of the users to which the email pertains, and paste these email addresses in a text box or other graphical user interface element. In this implementation, the graphical user interface element may be exposed by a different computer program than that from which the user may be retrieving the list of users. For example, the user may be retrieving the list of users from an email messaging computer program, and inputting this list into a different computer program.

The method 300 retrieves information regarding each user within the selected group (304), via the identification of the users provided in part 302, such as based on their email addresses. The information regarding each user can be retrieved by looking up each user, such as via his or her email address, within a database. Such databases can include internal, private databases of corporations or other entities, as well as external, public databases, such as those maintained by social networking web sites, search engines, and so on. The information that is retrieved for each user can include the user's full name, title, employer, job group, location, family information, and so on.

The method 300 determines relationships among the users based on the information that has been retrieved regarding each user (306). Determining the relationships can include organizing the users over job groups and/or locations, where each recipient belongs to one or more of the job groups and/or is associated with one of the locations. Determining the relationships can include organizing the users in accordance with their job titles and/or family relationships. Determining the relationships can include organizing the users in other ways as well.

In general, determining the relationships among the users can include sorting the users into various categories, and/or determining how the users are connected to one another. Consider the example of FIGS. 1 and 2A, 2B, and 2C that has been described above. There are two sets of categories: job group and location. Each user is thus assigned to a job group and to a location, which effectuates the relationships depicted in FIGS. 2B and 2C as to group and location. Furthermore, connections with the users are determined based on job title-oriented information, specifically which users report to whom, which effectuates the relationships depicted in FIG. 2A as to title.

Once the relationships among the users have been determined, the relationships are displayed on a display device (308). The display of the relationships can be static, in that once the relationships have been displayed, a user cannot interact with the display. However, the display of the relationships can be dynamic, in that once the relationships have been displayed, a user can interact with the display so that the display of the relationships changes in accordance with user input related thereto. Examples of such dynamic interactive display have been presented in relation to FIGS. 2A, 2B, and 2C.

Figure 4:
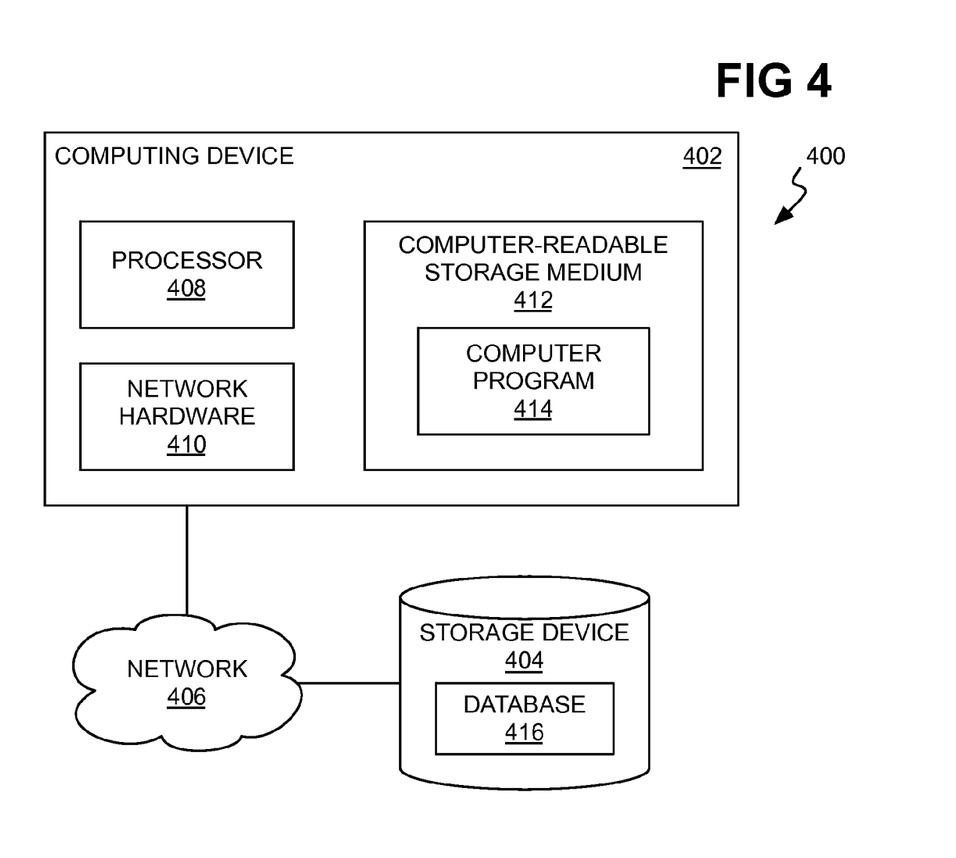
FIG. 4 is a diagram of a system, according to an embodiment of the disclosure.

FIG. 4 shows a representative system 400, according to an embodiment of the disclosure. The system 400 includes a computing device 402 interconnected to a storage device 404 over a network 406. The computing device 402 may be a client computing device, like a laptop or a desktop computer, a smartphone, and so on. The storage device 404 may be part of a server computing device, and may be a hard disk drive, for instance. The network 406 may be or include one or more of the Internet, an intranet, an extranet, a local-area network (LAN), a wide-area network (WAN), a telephony network, and so on.

The computing device 402 includes a processor 408, network hardware 410, and a computer-readable storage medium 412. The computing device 402 can and typically does include or is connected to other hardware as well, such as a display device. The computer-readable data storage medium 412 stores a computer program 414. The processor 408 executes the computer program 414 from the computer-readable storage medium 412. The network hardware 410 communicatively connects the computing device 402 to the network 406, and thus to the storage device 404.

Execution of the computer program 414 by the processor 408 from the computer-readable data storage medium 412 causes the method 300 to be performed. The computer program 414 may be an email messaging computer program, such that the method 300 is performed by the email messaging computer program, or by another computer program. The computer program 414 receives retrieves information regarding each user that is identified, from the database 416 stored on the storage device 404. The computer program 414 then determines relationships among the users, and displays the relationships, as has been described.

It is noted that while usage scenarios have been described herein that focus more in the work realm, other implementations of the techniques disclosed herein are applicable other types of usage scenarios, such as those in the social realm. For instance, a user may receive an electronic invitation to a social event that includes a list of other invitees. Per the techniques disclosed herein, the user is able to view the relationships of those invitees, where the information regarding each invitee may be obtained from social networking web sites. The invitees themselves may be identified by name, email address, or in another manner.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:

receiving, by an email messaging computer program of a given user executed by a processor, one email having a plurality of users as recipients thereof, including the given user;

displaying, by the email messaging computer program as executed by the processor, the one email to the given user within an email display area of a graphical user interface (GUI) window of the email messaging computer program;

after displaying the one email to the given user, and responsive to receiving user selection of a GUI button displayed within the GUI window, receiving, by the processor, identification of the users;

retrieving, by the processor, information regarding recipient of the one email;

determining, by the processor, a plurality of relationships of a plurality of different relationship types among the users as recipients of the one email, based on the information retrieved regarding each user as the one of the recipients of the one email, the relationships including relationships among the recipients of the one email;

displaying, by the email messaging computer program as executed by the processor, the relationships of a first relationship type of the different relationship types among the recipients of the email to the given user within a second GUI window, the second GUI window displayed responsive to receiving user selection of the GUI button displayed within the GUI window, wherein displaying the relationships of the first relationship type comprises:

displaying a GUI element for each recipient at a corresponding position within the second GUI window, the GUI element for each recipient including a name of the recipient;

for each relationship of the first relationship type, displaying a corresponding polygon surrounding the GUI element of each recipient that is part of the relationship, the corresponding polygon having a unique line type;

for each relationship of the first relationship type, displaying text identifying the relationship inside the polygon outside of the GUI element of each recipient;

displaying, by the email messaging computer program, a plurality of second GUI buttons within the second GUI window, each second GUI button corresponding to one of the different relationship types, the second GUI buttons separate from the relationships displayed within the second GUI window; and responsive to receiving user selection of a particular button of the second GUI buttons displayed within the second GUI window, displaying within the second GUI window, by the email messaging computer program, the relationships of the relationship type corresponding to the particular button, comprising:

displaying the GUI element for each recipient at the corresponding position within the second GUI window, the corresponding position at which the GUI element for each recipient is displayed as part of displaying the relationships of the relationship type corresponding to the particular button being a same position at which the GUI element was displayed as part of displaying the relationships of the first relationship type;

for each relationship of the relationship type corresponding to the particular button, displaying a second corresponding polygon surrounding the GUI element of each recipient that is part of the relationship, the second corresponding polygon having a second unique line type;

for each relationship of the relationship type corresponding to the particular button, displaying text identifying the relationship inside the polygon and outside the GUI element of each recipient; and after displaying the one or more relationships among the users, and responsive to the given user initiating a reply-all email response to the email, permitting the given user to tailor who will receive the reply-all email response to the email from among the users, based on the one or more relationships among the users that have been displayed.

2. The method of claim 1, further comprising receiving identification of the users.

3. The method of claim 1, wherein retrieving the information regarding each user comprises looking up each user within a database.

4. The method of claim 1, wherein determining the relationships among the users comprises one or more of:
organizing the users over a plurality of job groups, where each user belongs to one or more of the job groups;
organizing the users in accordance with job titles of the users;
organizing the users over a plurality of locations, where each user is associated with one of the locations;
organizing the users in accordance with family relationships of the users.

5. The method of claim 1, wherein displaying the relationships among the users comprises permitting user interaction with a display of the relationships among the users such that the display changes in accordance with user input related thereto.

6. The method of claim 1, further comprising:
after displaying the one or more relationships among just the users, and responsive to the given user initiating a reply-all email response to the email,
permitting the user to tailor who will receive the reply-all email response to the email from among the users, based on the one or more relationships among just the users that have been displayed.

7. A system comprising:
a processor;
network hardware to communicatively connect to a storage device over a network, the storage device storing a database of information regarding a plurality of users; and,
a storage device storing an email communication computer program executable by the processor to:
receive one email having a plurality of given users of the plurality of users as recipients thereof, including a particular user that is operating the email communication computer program;
display the one email to the particular user within an email display area of a graphical user interface (GUI) window of the email communication computer program; and
after displaying the one email to the particular user, and responsive to receiving user selection of a GUI button displayed within the GUI window:
retrieve from the database information regarding the given users;
determine a plurality of relationships of a plurality of different relationship types among the given users, based on the information regarding the given users, the relationships including relationships among the given users;
display the relationships of a first relationship type of the different relationship types among the given users to the particular user within a second GUI window, the second GUI window displayed responsive to receiving user selection of the GUI button displayed within the GUI window, wherein displaying the relationships of the first relationship type comprises:
displaying a GUI element for each recipient at a corresponding position within the second GUI window, the GUI element for each recipient including a name of the recipient;
for each relationship of the first relationship type, displaying a corresponding polygon surrounding the GUI element of each recipient that is part of the relationship, the corresponding polygon having a unique line type;
for each relationship of the first relationship type, displaying text identifying the relationship inside the polygon outside of the GUI element of each recipient;
display a plurality of second GUI buttons within the second GUI window, each second GUI button corresponding to one of the different relationship types, the second GUI buttons separate from the relationships displayed within the second GUI window; and
responsive to receiving user selection of a particular button of the second GUI buttons displayed within the second GUI window, display within the second GUI window, by the email messaging computer program, the relationships of the relationship type corresponding to the particular button, comprising:

displaying the GUI element for each recipient at the corresponding position within the second GUI window, the corresponding position at which the GUI element for each recipient is displayed as part of displaying the relationships of the relationship type corresponding to the particular button being a same position at which the GUI element was displayed as part of displaying the relationships of the first relationship type;

for each relationship of the relationship type corresponding to the particular button, displaying a second corresponding polygon surrounding the GUI element of each recipient that is part of the relationship, the second corresponding polygon having a second unique line type;

for each relationship of the relationship type corresponding to the particular button, displaying text identifying the relationship inside the polygon and outside the GUI element of each recipient.

8. The system of claim 7, wherein the computer program is to determine the relationships among the users by one or more of:

organizing the users over a plurality of job groups, where each user belongs to one or more of the job groups;

organizing the users in accordance with job titles of the users;

organizing the users over a plurality of locations, where each user is associated with one of the locations;

organizing the users in accordance with family relationships of the users.

9. The system of claim 7, wherein the computer program is to display the relationships among the users by permitting user interaction with a display of the relationships among the users, via an input device, such that the display changes in accordance with user input related thereto.

10. The system of claim 7, wherein the computer program is further to:

after displaying the one or more relationships among just the given users, and responsive to the particular user initiating a reply-all email response to the email, permit the user to tailor who will receive the reply-all email response to the email from among the given users, based on the one or more relationships among just the given users that have been displayed.

11. A computer program product comprising a storage device storing computer-readable code executable by a processor to perform a method comprising:

receiving, by an email messaging computer program of a user, one email having a plurality of recipients including the user;

displaying, by the email messaging computer program, the one email to the user within an email display area of a graphical user interface (GUI) window of the email messaging computer program;

after displaying the one email to the user, and responsive to receiving user selection of a GUI button displayed within the GUI window, retrieving information regarding each recipient of the one email;

determining a plurality of relationships of a plurality of different relationship types among the recipients of the one email, based on the information retrieved regarding each recipient of the one email, the plurality of relationships including relationships among the recipients of the one email;

displaying, by the email messaging computer program, the relationships of a first relationship type of the different relationship types among the recipients of the email to the user within a second GUI window, the second GUI window displayed responsive to receiving user selection of the GUI button displayed within the GUI window, wherein displaying the relationships of the first relationship type comprises:

displaying a GUI element for each recipient at a corresponding position within the second GUI window, the GUI element for each recipient including a name of the recipient;

for each relationship of the first relationship type, displaying a corresponding polygon surrounding the GUI element of each recipient that is part of the relationship, the corresponding polygon having a unique line type;

for each relationship of the first relationship type, displaying text identifying the relationship inside the polygon outside of the GUI element of each recipient;

displaying, by the email messaging computer program, a plurality of second GUI buttons within the second GUI window, each second GUI button corresponding to one of the different relationship types, the second GUI buttons separate from the relationships displayed within the second GUI window; and responsive to receiving user selection of a particular button of the second GUI buttons displayed within the second GUI window, displaying within the second GUI window, by the email messaging computer program, the relationships of the relationship type corresponding to the particular button, comprising:

displaying the GUI element for each recipient at the corresponding position within the second GUI window, the corresponding position at which the GUI element for each recipient is displayed as part of displaying the relationships of the relationship type corresponding to the particular button being a same position at which the GUI element was displayed as part of displaying the relationships of the first relationship type;

for each relationship of the relationship type corresponding to the particular button, displaying a second corresponding polygon surrounding the GUI element of each recipient that is part of the relationship, the second corresponding polygon having a second unique line type;

for each relationship of the relationship type corresponding to the particular button, displaying text identifying the relationship inside the polygon and outside the GUI element of each recipient.

12. The computer program product of claim 11, wherein receiving the request from the user in relation to the email comprises:

receiving user selection of a graphical user interface element of a graphical user interface in conjunction with which the email has been displayed and exposed by an email messaging computer program.

13. The computer program product of claim 11, wherein receiving the request from the user in relation to the email comprises:

receiving user entry of a list of the recipients of the email within a graphical user interface element of a graphical user interface of a computer program other than an email messaging computer program exposing another graphical user interface in conjunction with which the email has been displayed.

14. The computer program product of claim 11, wherein retrieving the information regarding each recipient of the email comprises:
   looking up each recipient of the email, by an email address thereof included in the email, within a database.

15. The computer program product of claim 11, wherein determining the relationships among the recipients of the email comprises:
   organizing the recipients of the email over a plurality of job groups, each recipient of the email belonging to one or more of the job groups.

16. The computer program product of claim 11, wherein determining the relationships among the recipients of the email comprises:
   organizing the recipients of the email in accordance with job titles of the recipients.

17. The computer program product of claim 11, wherein determining the relationships among the recipients of the email comprises:
   organizing the recipients of the email over a plurality of locations, each recipient of the email associated with one of the locations.

18. The computer program product of claim 11, wherein determining the relationships among the recipients of the email comprises:
   organizing the recipients of the email in accordance with family relationships of the recipients.

19. The computer program product of claim 11, wherein displaying the relationships among the recipients of the email to the user comprises:
   permitting a user to dynamically interact with a display of the relationships among the recipients of the email such that the display changes in accordance with user input related thereto.

20. The computer program product of claim 11, wherein the method further comprises:
   after displaying the one or more relationships among just the recipients of the email, and responsive to the user initiating a reply-all email response to the email,
   permitting the user to tailor who will receive the reply-all email response to the email from among the recipients of the email, based on the one or more relationships among just the recipients that have been displayed.

* * * * *